United States Patent [19]

Matrozza

[11] Patent Number: 4,579,740
[45] Date of Patent: Apr. 1, 1986

[54] FERMENTATION METHOD USING A SELECTED LACTOBACILLUS

[75] Inventor: Mark A. Matrozza, Sarasota, Fla.

[73] Assignee: Microlife Technics, Inc., Sarasota, Fla.

[21] Appl. No.: 512,539

[22] Filed: Jul. 11, 1983

[51] Int. Cl.$^4$ ............................................... A23L 1/31
[52] U.S. Cl. ..................................... 426/59; 426/55; 426/56; 435/253; 435/856
[58] Field of Search .................... 426/7, 9, 48, 55, 56, 426/59; 435/139, 856, 253

[56] References Cited

U.S. PATENT DOCUMENTS

| | | | |
|---|---|---|---|
| 2,225,783 | 12/1940 | Jensen | 426/59 |
| 2,945,766 | 7/1960 | Chaiet | 426/59 |
| 3,193,391 | 7/1965 | Jansen | 426/56 |
| 4,041,181 | 8/1977 | Burrows | 426/55 |
| 4,160,038 | 7/1979 | Groben | 426/56 X |
| 4,303,679 | 12/1981 | Raccach | 426/59 |
| 4,407,828 | 10/1983 | Raccach | 426/56 |

OTHER PUBLICATIONS

Bergey's Manual of Determinative Bacteriology, 8th ed., 1974, pp. 583–584.

*Primary Examiner*—Sam Rosen
*Assistant Examiner*—Jeremy M. Jay
*Attorney, Agent, or Firm*—Ian C. McLeod

[57] ABSTRACT

A method is described for producing fermented foods by generating lactic acid in the food using a culture having the rapid, low temperature fermentation characteristics of *Lactobacillus casei* NRRL-B-15,438 and a stimulatory food grade metal salt, wherein the culture has unique rapid low temperature fermentation characteristics and wherein starch is not fermented by the culture. In order to provide rapid fermentation, the stimulatory, food grade metal salt, usually a manganese salt, is provided in the food or the culture which is added to the food with the selected lactobacillus to accelerate fermentation. The cultures are particularly suited for the controlled fermentation of carbohydrates, naturally present in or added to the food to provide a selected final pH.

8 Claims, No Drawings

FERMENTATION METHOD USING A SELECTED LACTOBACILLUS

BACKGROUND OF THE INVENTION

The present invention relates to a method for fermenting foods using selected cultures of a lactobacillus having essentially the rapid low temperature fermentation characteristics of *Lactobacillus casei* NRRL-B-15,438 usually at food temperatures of between 15.6° C. (60° F.) and 26.7° C. (80° F.) in the presence of an effective amount of a stimulatory, food grade metal salt, preferably a manganese salt. Fermentation temperatures in the range between about 15.6° C. (60° F.) and 48.9° C. (120° F.) can be used; however, lower temperatures than 26.7° C. (80° F.) are preferred, particularly to reduce the risk of significant *Staphlococcus aureus* growth in fermented meats.

Prior Art

The prior art has generally described meat fermentation methods using many different cultures of lactobacilli which generate lactic acid from dextrose, lactose, glycogen, sucrose and/or starch in foods. U.S. Pat. Nos. 2,225,783 and 3,193,391 to Jensen et al; 3,098,744 to Von Lorch et al; 3,814,817 to Everson et al and 3,561,977 and 3,910,664 to Rothchild et al are representative of this prior art which is extensive. In this prior art, various strains of lactobacilli are described as useful for fermenting foods; however, these cultures have the characteristic of fermenting lactose, starch and glycogen which, when present in uncontrolled or unknown amounts in a meat mixture to be fermented, can result in the production of excessive amounts of lactic acid causing an undesirable low final pH in the fermented meat.

It is generally true of lactobacilli and specifically most strains of *Lactobacillus casei* that sausage fermentation proceed very slowly or not at all at temperatures less than 26.7° C. (80° F.). Commercially meat fermentations are usually conducted above 26.7° C. (80° F.) for this reason.

Usually semi-dry sausage is prepared by fermenting a carbohydrate particularly dextrose and/or naturally occurring glycogen in meat in less than about 30 hours. Dry sausage is usually fermented over a period of at least two to three days. Both methods preferably involve a rapid initial fermentation which produces lactic acid in the meat thereby lowering the pH. Once the pH is lowered to the desired level any further lowering of the pH makes the product unacceptable. This can particularly occur during the drying period required to make dry sausage.

In general, the prior art strains of lactobacilli used for making sausage to develop a pH of less than about 5.0 in about 30 hours or less, require fermentation at an elevated temperature range between about 26.6° C. to 45° C. (80° F. to 113° F.). These lactobacilli are too slow at lower meat temperatures between about 10° C. to 26.7° 50° F. to 80° F.) since they take much longer to develop a pH of less than about 5.0.

In U.S. Pat. No. 4,303,679 the use of manganese salts in the fermentation of meats using specific unique strains of *Pediococcus pentosaceus* is described. U.S. Pat. No. 2,945,766 to Chiat generally describes the use of manganese salts in meat fermentations with lactobacilli at temperatures at or above 26.7° C. (80° F.).

Hanna, M. O., et al Journal of Food Protection Vol 43 pages 837–841 describe the use of *Lactobacillus casei* subspecies *alactosus* in vacuum packed meat at 1° to 3° C. for preservation without fermentation. These cultures were not effective and detracted from the taste of the meat.

This application describes an improvement over *Lactobacillus casei* subspecies *alactosus* described in co-pending application Ser. No. 268,354, filed May 29, 1981 by Moshe Raccach now U.S. Pat. No. 4,407,828.

Objects

It is therefore an object of the present invention to provide a method for producing fermented foods using a culture of a lactobacillus having the essential rapid, low temperature fermentation characteristics of *Lactobacillus casei* NRRL-B-15,438 with a stimulatory metal salt which culture ferments rapidly at low temperatures. It is particularly an object of the present invention to provide a method wherein fermented meats can be produced using *Lactobacillus casei* NRRL-B-15,438 and stimulatory metal salt wherein the meat mixture to be fermented contains unknown or uncontrolled amounts of certain carbohydrates. These and other objects will become increasingly apparent from the following description.

General Description

The present invention relates to the improvement in a food fermentation method including the steps of providing lactic acid producing bacteria in the food with an assimilable carbohydrate and then fermenting the food with the bacteria so that lactic acid is produced from the carbohydrate over a period of time in the food which comprises: providing in admixture in a food a culture of a lactobacillus with an assimilable carbohydrate and with a stimulatory, food grade metal salt in an amount sufficient to accelerate the fermentation by the lactobacillus, wherein the culture has essentially the rapid, low temperature fermentation characteristics of *Lactobacillus casei* NRRL-B-15,438; and fermenting the food admixture at temperatures between about 15.6° C. and 48.9° C. so that lactic acid is produced in the food product.

The present invention particularly relates to the meat fermentation method including the steps of providing lactic acid producing bacteria in the meat with an assimilable sugar and then fermenting the meat with the bacteria so that lactic acid is produced from the sugar over a period of time in the fermented meat wherein the improvement comprises: providing in admixture in meat a culture of *Lactobacillus casei* NRRL-B-15,438 at a concentration of between about $10^5$ and $10^9$ of the lactobacillus per gram of meat with an assimilable carbohydrate and with a stimulatory food grade manganese salt in an amount sufficient to stimulate the growth of the lactobacillus; and fermenting the meat admixture at smokehouse temperatures between about 15.6° C. and 48.9° C. so that lactic acid is produced in the fermented meat product. The lactobacillus culture is characterized by an ability to rapidly ferment in the meat admixture at meat temperatures of about 24° C. to produce a pH of about 5 or less.

The present invention further relates to a culture of lactobacillus adapted for meat fermentations including an assimilable carbohydrate at smokehouse temperatures between about 15.6° C. and 48.9° C. which comprises a selected lactobacillus grown in growth medium including assimilable sources of carbon, nitrogen and inorganic substances to a concentration of at least about $1 \times 10^7$ of the lactobacillus per ml, having a pH between about 4 and 8 and containing a stimulatory food grade metal salt after growth in an amount sufficient to accelerate the fermentation in the meat by providing a concentration of metal ion between about 0.01 ppm and 1500 ppm in the meat, wherein the selected lactobacillus culture has essentially the rapid, low temperature characteristics of *Lactobacillus casei* NRRL-B-15,438.

The lactobacillus cells can be used as a concentrate having a pH between about 4 and 8 containing at least about $1 \times 10^7$ cells per gram up to about $10^{15}$ cells per gram, usually between about $1 \times 10^9$ and $10^{12}$ cells per gram, mixed with the stimulatory metal salt, preferably a manganese salt. The concentrates are prepared by centrifugation, by reverse osmosis, by ultrafiltration, or by dialysis, of the cells in the growth medium, all of which are well known to those skilled in the art. The concentrates containing the stimulatory metal salt can be frozen with or without a freezing stabilizing agent such as monosodium glutamate, malt extract, non-fat dry milk, alkali metal glycerophosphate, glutamic acid, cystine, glycerol, or dextran or the like and then thawed for use or the concentrates can be lyophilized to a powder as is well known to those skilled in the art. The bacterial cells are used in a range between about $10^5$ to $10^9$ cells per gram of meat.

The stimulatory metal salt is used in an amount of metal cation in the salt above about 0.01 parts per million to about 1500 parts per million by weight of the food to be fermented, preferably between about 0.1 and 100 ppm. The metal salt must be food grade. Such salts include for instance: manganese chloride, manganese sulfate, manganese citrate, manganese glycerophosphate, manganese oxide and manganese gluconate and various non-toxic metal salts of acids which are at least slightly soluble in water. Other metal salts include ferrous, ferric, magnesium, calcium, zinc salts; however, none are as effective as manganese. The metal salt can be incorporated into the bacterial culture in an amount between about 0.01 and 50 percent by weight of the culture in order to provide the required amount of the metal salt needed in the food when the culture is added.

The low temperature *Lactobacillus casei* NRRL-B-15,438, admixed with the stimulatory metal salt causes nitrite reduction due to the lowering of the pH of the meat in fermented meats, particularly pork including bacon and ham at a pH of between about 5 and 6 and at a concentration of bacteria between about $10^5$ and $10^{10}$ cells per ml. Usually the bacteria are included in the aqueous pickling solution and added to the meat as a spray or injected in an amount up to 15% by weight of the meat. Bacon is usually not reduced to a pH less than about 6 from an initial pH of 6.3 to 6.4. The lactobacillus with a stimulatory metal salt can lower the pH thus causing the nitrite reduction at lower temperatures than can be achieved in the absence of the stimulatory metal salt.

Specific Description

The selected *Lactobacillus casei* strain of the present invention has been deposited at the Northern Regional Research Laboratory of the USDA, Peoria, Ill. and was designated as NRRL-B-15,438. The essential identification characteristics of this strain are shown in Table V.

TABLE I

| Carbohydrate Fermentation Pattern | |
|---|---|
| Substrate | Fermentation Reaction |
| Adonitol | Negative |
| Arabinose | Negative |
| Cellobiose | Negative |
| Dextrose | Positive |
| Dulcitol | Negative |
| Galactose | Slow Positive |
| Glycerol | Negative |
| Inositol | Negative |
| Lactose | Positive |
| Maltose | Negative |
| Mannitol | Negative |
| Mannose | Positive |
| Melibiose | Negative |
| Nitrate reductase | Negative |
| ONPG | Negative |
| Raffinose | Negative |
| Rhamnose | Negative |
| Salicin | Negative |
| Sorbitol | Negative |
| Sucrose | Positive |
| Trehalose | Positive |
| Xylose | Negative |
| Starch | Negative |
| Esculin | Negative |
| Levulose | Negative |
| Amygdalin | Weak ± |
| Ribose | Positive |
| Catalase | Negative |

Growth at 17° C., 24° C., 35° C. and no growth at 45° C.

EXAMPLE 1

The preparation of a bacterial concentrate is described in this example. *Lactobacillus casei* NRRL-B-15,438 was grown in a growth medium such as described in U.S. Pat. Nos. 3,561,977 and 3,960,664. The medium includes a carbohydrate (glucose or other assimilable sugar) a nitrogen source (yeast extract or other source of amino acids) and traces of essential minerals or inorganic substances usually including a manganese salt (manganese sulfate monohydrate). The pH of the medium was initially adjusted to between 6.5 to 6.7 and the fermentor was set to maintain a pH of 6.0 during growth by the intermittent addition of ammonia. NRRL-B-15,438 was grown at 35° C. for about 15 hours. The bacteria were then concentrated using a centrifuge and, where the concentrate was not to be used immediately, were mixed with glycerine as a freezing stabilizing agent (10% by weight) and frozen for storage. The concentrates were also mixed with the manganese sulfate monohydrate as indicated in the following Examples prior to freezing.

EXAMPLE 2

A frozen concentrate of NRRL-B-15,438 was prepared in a laboratory fermentor as described in Example 1. The *Lactobacillus casei* NRRL-B-15,438 culture of Example 1 prior to centrifugation contained about $5 \times 10^9$ cells per milliliter in the growth medium. The culture was centrifuged and then resuspended at the rate of 5 milliliters of supernatant liquid per 100 ml of original culture. This concentrate was diluted with tap water and was inoculated into 0.908 kg (2 pounds) of sausage mix (100% pork with 3.3% salt, 1.0% dextrose, spices and 0.0156% sodium nitrite) to deliver about $1.8 \times 10^7$ cells per gram of the sausage mix.

Procedure

The meat was comminuted to the selected size.

(2) The dextrose, salt, spice mix, and sodium nitrite were added to the comminuted meat and mixed.
(3) The sausage mix was divided into aliquots and inoculated with appropriate cultures with or without added metal salt, and mixed thoroughly.
(4) The sausage mix was stuffed into 53 mm diameter fibrous casings using a hydraulic stuffer.
(5) The sausages were fermented at 24° C. (75.2° F.) dry bulb and 21° C. (69.8° F.) wet bulb (80% room humidity) using a controlled environment chamber.

Determination of pH (1) The pH of the sausage was determined at various times.

(2) Thirty grams of sausage were blended with 90 ml distilled water for 30 to 60 seconds. The pH of the slurry was determined. Prior to each pH reading, the pH meter was calibrated against two standard buffers (pH values of 7.00 and 4.01).

*Lactobacillus casei* NRRL-B-15,438 was tested with no metal ion and with manganese sulfate monohydrate in an amount of 4 parts per million of the metal cation based upon the weight of the sausage.

The sausage mix was stuffed into 44 mm diameter fibrous casings using a hydraulic stauffer.

The sausage were fermented at 24° C. (75.2° F.) wet bulb and 25° C. (77° F.) dry bulb (92% relative humidity) using a controlled environment chamber.

Results

The results are shown in Table II.

TABLE II

| Treatment *Lactobacillus casei* NRRL-B-15,438 | (pH) Fermentation Period (Hours) | | | | |
|---|---|---|---|---|---|
| | 0 | 13 | 16 | 19 | 21 |
| Control (no additive) | 5.98 | 5.88 | 5.68 | 5.50 | 5.35 |
| Mn sulfate monohydrate | 5.98 | 5.80 | 5.52 | 5.25 | 5.12 |

The initial concentration of cells was half the usual inoculum. Thus, usually $3.6 \times 10^7$ cells per gram of meat is the inoculation rate. The data in Table II at an inoculation rate of $1.8 \times 10^7$ cells per gram of meat shows that NRRL-B-15,438 is still fast at lower temperatures. This can be seen from Example 3. Example 3 also shows the very rapid red color development.

EXAMPLE 3

Sausages were prepared as in Example 2 and were inoculated with production fermenter produced *Lactobacillus casei* NRRL-B-15,438 or with a commercial preparation of *Pediococcus pentosaceus* NRRL-B-11,465 to compare fermentation speed and color development at 24° C. (75.2° F.) wet bulb temperature. Both sausages contained manganese sulfate monohydrate in an amount of 4 parts per million of the metal cation based on the weight of the sausage.

*Pediococcus* NRRL-B-11,465 was added at a rate to deliver $3.6 \times 10^7$ cells per gram of meat and *Lactobacillus casei* NRRL-B-15,438 was added at a rate to deliver $1.8 \times 10^7$ cells per gram of meat.

Sausages were incubated at temperatures as described in Example 2.

Results

The results are shown in Table III.

TABLE III

| | (Fermentation Period in Hours) | | | | | | | | | | |
|---|---|---|---|---|---|---|---|---|---|---|---|
| | 0 | | 15.75 | | 17 | | 19.5 | | 21.25 | | 24.25 |
| Treatment | pH | Color | pH | Color | pH | Color | pH | Color | pH | Color | pH | Color |
| *Pediococcus* NRRL-B-11465 | 5.86 | 0 | 5.69 | 0 | 5.61 | 0 | 5.59 | 0 | 5.45 | 3+ | 5.24 | 4+ |
| *Lactobacillus casei* NRRL-B-15438 | 5.86 | 0 | 5.04 | 5+ | 4.98 | 5+ | — | — | — | — | — | — |

Color
0 = No color development
5+ = Full red color development

The results indicate that *Lactobacillus casei* NRRL-B-15,438 is superior in producing cured meat color and is much faster than *Pediococcus* NRRL-B-11,465 in acid production in sausage fermented at 24° C. even though half as many cells were used.

EXAMPLE 4

A concentrate of *Lactobacillus casei* NRRL-B-15,438 was prepared as described in Example 2 and was lyophilized using procedures well known to those skilled in the art. Sausages were made as described in Example 2 except lyophilized cells of *Lactobacillus casei* NRRL-B-15,438 were added at a rate to deliver $1 \times 10^7$ viable *Lactobacillus casei* NRRL-B-15,438 cells per gram of meat.

The sausages were incubated as described in Example 5.

Results

The results are shown in Table IV.

TABLE IV

| Treatment Lyophilized *Lactobacillus casei* NRRL-B-15,438 | Fermentation Period (Hours) | | | | | |
|---|---|---|---|---|---|---|
| | 0 | 21 | 24 | 26.25 | 28.5 | 30.5 |
| Control (No MnSO₄ monohydrate) | 5.9 | 5.76 | 5.58 | 5.46 | 5.37 | 5.32 |
| MnSO₄ monohydrate | 5.9 | 5.67 | 5.42 | 5.24 | 5.07 | 4.95 |

The results in Table IV show that lyophilized cells of *Lactobacillus casei* NRRL-B-15,438 also are stimulated by manganese ion at 24°°C.

Lactobacillus species having the rapid, low temperature fermentation characteristics as *Lactobacillus casei* NRRL-B-15,438 with a stimulatory metal salt provides a significantly improved method for fermenting foods, vegetables and meats. *Lactobacillus casei* NRRL-B-15,438 is particularly preferred because of the rapid red color development over NRRL-B-12,344 described in application Ser. No. 268,354.

I claim:

1. In a method for fermenting meat including the steps of providing lactic acid producing bacteria in the meat with an assimilable carbohydrate and then fermenting the meat with the bacteria so that lactic acid is produced from the carbohydrate over a period of time in the meat the improvement which comprises:
   (a) providing in admixture in meat containing a food grade nitrite as a preservative a culture of a lactobacillus with an assimilable carbohydrate and with a stimulatory, food grade metal salt in an amount sufficient to accelerate the fermentation by the lactic acid producing bacteria, wherein the culture has the identification characteristics of *Lactobacillus casei* NRRL-B-15,438 and ferments rapidly at low temperatures; and
   (b) fermenting the meat admixture at temperatures between about 15.6° C. and 48.9° C. so that lactic acid is produced in the meat with rapid and full red color development.

2. In a meat fermentation method including the steps of providing lactic acid producing bacteria in the meat with an assimilable sugar and then fermenting the meat with the bacteria so that lactic acid is produced from the sugar over a period of time in the fermented meat the improvement which comprises:
   (a) providing in admixture in meat containing a food grade nitrite as a preservative a culture of *Lactobacillus casei* NRRL-B-15,438 at a concentration of between about $10^5$ and $10^9$ of said lactobacillus per gram of meat with an assimilable carbohydrate and with a stimulatory, food grade manganese salt in an amount sufficient to stimulate the growth of the lactobacillus; and
   (b) fermenting the meat admixture at smokehouse temperatures between about 15.6° C. and 48.9° C. so that lactic acid is produced with rapid and full color development in the fermented meat.

3. The method of claim 2 wherein the lactobacillus, sugar, preservatives and metal salt are added to the meat as an aqueous pickling solution containing between about $10^5$ to $10^{10}$ of the lactobacillus per ml in an amount of the pickling solution up to about 15 percent by weight based upon the meat weight and wherein the meat is held at 21.1° C. to 38° C. until a pH between about 5 and 6 is achieved.

4. The method of claim 2 wherein the manganese salt is manganese sulfate and wherein the meat is fermented at temperatures of 26.7° C. or less to produce a pH of less than about 5.

5. The method of claim 2 wherein the lactobacillus has been grown in the presence of a manganese salt and further manganese salt is added to the culture as the metal salt after growth and wherein the lactobacillus is admixed with the meat as a liquid concentrate containing at least about $10^7$ cells per gram.

6. The method of claim 5 wherein the bacterial concentrate is frozen with the manganese salt prior to use and thawed for use to provide a liquid concentrate for admixture with the meat.

7. The method of claim 2 wherein the lactobacillus is in a lyophilized, powdered form containing the manganese salt which is provided in the meat as a powder.

8. The method of claim 2 wherein portions of fermented meat are utilized as a source of lactobacillus for a subsequent meat fermentation with the metal salt.

* * * * *